UNITED STATES PATENT OFFICE.

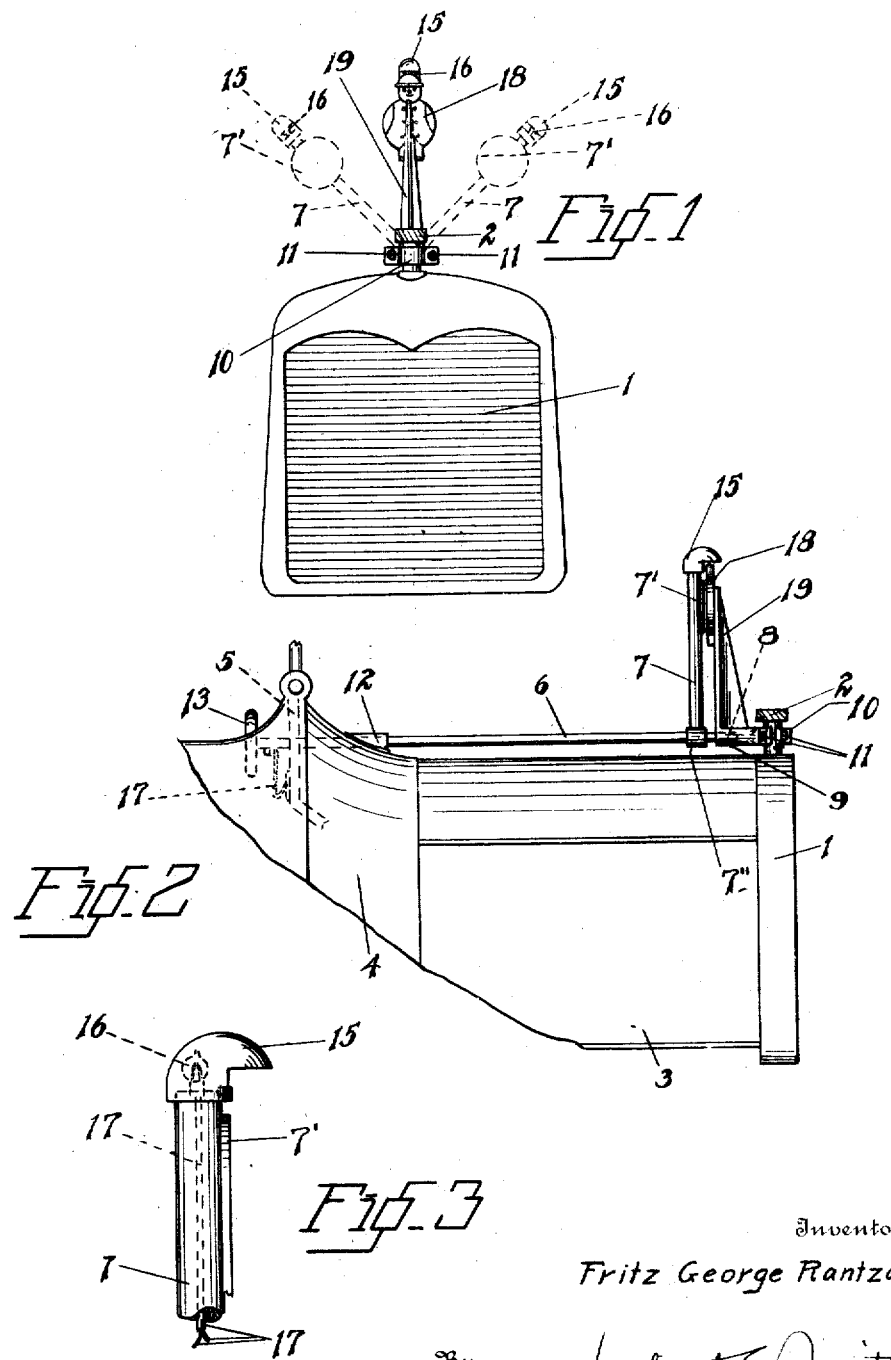

FRITZ GEORGE RANTZAU, OF SPOKANE, WASHINGTON.

VEHICLE-SIGNAL.

1,283,300.    Specification of Letters Patent.    Patented Oct. 29, 1918.

Application filed July 30, 1917.   Serial No. 183,510.

*To all whom it may concern:*

Be it known that I, FRITZ GEORGE RANTZAU, a citizen of the United States, residing at Spokane, in the county of Spokane and State of Washington, have invented certain new and useful Improvements in Vehicle-Signals, of which the following is a specification.

The present invention relates to an improved vehicle signal, designed especially for use as a visual signal for use on the front portion of an automobile.

The primary object of the invention is the provision of a signaling device for use at the front of an automobile, preferably adjacent to the radiator cap, and operated by mechanism actuated from the front seat of the automobile to indicate to pedestrians and others the direction of travel to be pursued by the car or automobile.

The invention consists in certain novel combinations and arrangements, whereby mechanism is provided for oscillating a signal arm to point either to the right or to the left to indicate direction of travel, as will be hereinafter pointed out and claimed.

In the accompanying drawings I have illustrated one complete example of the physical embodiment of my invention constructed according to the best mode I have so far devised for the practical application of the principles of the invention.

Figure 1 is a front elevation of an automobile radiator, showing the signal attached thereto.

Fig. 2 is a side view of so much of an automobile as is necessary to illustrate the invention applied thereto.

Fig. 3 is an enlarged view of a signal arm with the illuminating device used in connection with the signal.

In order to clearly exemplify my invention I have utilized a portion of the automobile as shown in the drawings, wherein the usual or standard form of radiator 1 is provided with the typical cap 2, and the hood 3 and cowl 4, together with the dash 5 are of usual construction.

In equipping automobiles with my invention I utilize a rock shaft 6 which is preferably hollow or tubular, located just above the hood and extending from the radiator through the cowl and dash. On the rock shaft near its front or forward end is a fixed hollow signal arm 7 which may be of suitable design, such for instance as is shown in the drawings, Fig. 1, where the upper part of the arm is a disk 7'. Other suitable or acceptable forms or shapes may be utilized on the signal arm, and the arm is adapted to be swung to the right or left, as indicated in dotted lines in Fig. 1, to point the direction of travel to be taken by the car.

The hollow or tubular shaft 6 is fixed in the base part 7'', of the arm, and the arm in turn is provided with a swiveled joint 8 in a bearing plate 9 which plate is attached to the radiator cap by means of the clamp plate 10 and the clamp screws or bolts 11. The bearing plate 9 and clamp plate 10 are securely clamped about the periphery of the radiator cap by means of the bolts 11' and this fastening means provides a rigid and stable support for the rock shaft at the front end thereof. At its rear end the shaft has support in a bearing sleeve 12 fixed in the cowl of the automobile, and the shaft extends through this sleeve back of the dash where it is provided with a hand wheel 13 by means of which the shaft may be turned. Suitable means are provided for holding the rock shaft in adjusted position, whether standing with the signal arm upright, or turned to either left or right.

In order that the signal may be effective at night time, or in the dark, I illuminate the signal arm at the top by providing it with a reflector-cap or hood 15 within which is inclosed the lamp bulb 16. The wires 17 from the lamp are passed down through the hollow post and thence back through the tubular rock shaft and a switch is provided in the circuit, together with the usual battery, so that the current may be utilized when desirable. It will thus be seen that the signal may be manipulated by turning the hand wheel, and the illuminating lamp, when lighted, will continuously shine on the signal whether turned or upright.

An ornament 18 of suitable design, such for instance as is shown in Fig. 1 of the drawings where the design is a grotesque representation of a policeman, is mounted on the rigid post 19 which rises from the bearing plate 9 and is directly in front of the movable signal arm when the latter is in an upright position.

What I claim is:—

The combination of an automobile signal, of a tubular rock shaft having a front swiveled joint and a rigid post, a hollow signal arm fixed on the shaft directly at the rear of the post and hidden from observation from the front by said post, a lamp at the top of the signal arm, electric wires passed through said arm and shaft, a battery and a switch included in the circuit for lighting the lamp, a support on the dash board for the shaft and a support on the radiator for the swiveled joint of the shaft, and a hand wheel for turning the shaft.

In testimony whereof I affix my signature.

FRITZ GEORGE RANTZAU.